United States Patent
von Praun et al.

(10) Patent No.: US 7,516,309 B2
(45) Date of Patent: Apr. 7, 2009

(54) METHOD AND APPARATUS FOR CONDITIONAL MEMORY ORDERING

(75) Inventors: Christoph von Praun, Munich (DE); Harold W. Cain, Hartsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 11/144,256

(22) Filed: Jun. 3, 2005

(65) Prior Publication Data

US 2006/0277385 A1    Dec. 7, 2006

(51) Int. Cl.
G06F 7/38    (2006.01)
(52) U.S. Cl. .................................. 712/225; 711/150
(58) Field of Classification Search ............... 712/225; 711/150
See application file for complete search history.

(56) References Cited

U.S. PATENT DOCUMENTS 5,222,229 A * 6/1993 Fukuda et al. ............... 713/375
2004/0073760 A1* 4/2004 Arimilli et al. .............. 711/163

* cited by examiner

*Primary Examiner*—Eddie P Chan
*Assistant Examiner*—John Lindlof
(74) *Attorney, Agent, or Firm*—Michael J. Buchenhorner; Douglas W. Cameron

(57) ABSTRACT

A method and apparatus for conditional memory ordering are disclosed. The cost of memory ordering is reduced by determining circumstances in which a memory ordering operation is unnecessary and avoiding the overheads of these operations by reducing the frequency of invoking hardware memory ordering mechanisms. Hardware instructions for implementing a conditional memory ordering method and apparatus is described which may be implemented in a multiprocessor environment. The conditional memory ordering instruction executes locally using a release vector containing release numbers for each processor in the system. The instruction first determines whether a processor identifier of the release number is associated with the current processor. Where it is not, a conditional register is examined and appropriate remote synchronization operations are commanded where necessary.

2 Claims, 2 Drawing Sheets

METHOD AND APPARATUS FOR CONDITIONAL MEMORY ORDERING

FIELD OF THE INVENTION

This invention broadly relates to the field of synchronization of processing in multiprocessor systems, and more particularly relates to performing efficient conditional memory ordering in multiprocessor computer systems.

BACKGROUND OF THE INVENTION

Serial computers present a simple and intuitive model to the programmer. A load operation returns the last value written to a given memory location. Likewise, a store operation binds the value that will be returned by subsequent loads until the next store to the same location. This simple model lends itself to efficient implementations. The accesses may even be issued and completed out of order as long as the hardware and compiler ensure that data and control dependences are respected.

For multiprocessors, however, neither the memory system model nor the implementation is as straightforward. The memory system model is more complex because the definitions of "last value written," "subsequent loads," and "next store" become unclear when there are multiple processors reading and writing a location. Furthermore, the order in which shared memory operations are done by one process may be used by other processes to achieve implicit synchronization. Consistency models place specific requirements on the order that shared memory accesses (events) from one process may be observed by other processes in the machines. More generally, the consistency model specifies what event orderings are legal when several processes are accessing a common set of locations.

Modern multiprocessor systems sometimes provide a weakly consistent view of memory to multithreaded programs. This means that the order of memory operations performed by one or more processors in the system may appear to have occurred out of sequence with respect to the order specified by each processor's program. When communication among processors necessitates establishing a well-defined ordering of operations, memory barrier instructions must be explicitly added by the programmer to specify the ordering.

In current processor architectures, these memory barrier instructions perform ordering with a "processor-centric" view. This means that memory ordering instructions control only the processing and visibility of memory accesses of the processor that performs the memory ordering operation. This model implies, for example, that if two processors want to communicate in a reliable producer-consumer mode, then both processors have to use appropriate memory ordering instructions. Typically, processors offer multiple variants of memory ordering instructions with different ordering guarantees. These variants are useful to tune the cost of memory ordering for processors with different roles in the synchronization (for example, a sender and receiver) but do not address the principal problem of the "processor-centric" memory ordering mechanism.

When the "processor-centric" mechanism of memory ordering is used at the application level, for example, for higher level constructs such as locks or bafflers, a significant number of memory ordering operations occur superfluously. Although this does not affect the correctness, it may degrade application performance because memory ordering operations are relatively costly compared to other instructions, and limit the amount of instruction-level parallelism that may be exploited by the processor. Because memory systems in modern computer systems are typically highly parallel and use queuing at multiple levels, in order to ensure that a memory operation has been ordered with respect to other processors in the system, the most expensive types of memory ordering operations require broadcasting a special message throughout the memory system ensuring that all of the processor's previous messages have been drained from any queues in the system. Therefore there is a need for avoidance of these broadcast operations.

BRIEF SUMMARY OF THE INVENTION

Briefly according to embodiments of the invention, a method, program product, and apparatus for conditional memory ordering, determines circumstances in which a memory ordering operation is unnecessary, and avoids the overhead of these operations by reducing the frequency of invoking a hardware memory ordering mechanism.

One or more embodiments of the present invention provide a method and apparatus for providing hardware support for conditional memory ordering operations on applications designed for a multiprocessor environment. The present embodiment may reduce the number of unnecessary memory ordering operations that often occur in such systems. One or more embodiments are based on two key ideas: (1) conditional memory ordering should not be processor centric—rather, it may allow one processor to control the ordering of operations performed by another processor in the system; and (2) the necessity of invoking the memory ordering mechanism may be determined dynamically according to information about the previous memory ordering events in a multiprocessor system.

One or more embodiments of the present invention provide for a conditional synchronization instruction in which unnecessary synchronizations are reduced by determining circumstances in which a memory ordering operation is unnecessary and avoiding the overhead by reducing the frequency of invoking hardware memory ordering mechanisms. The conditional memory ordering instruction executes locally using a release vector containing release numbers or each processor in the system. The instruction first determines whether a processor identifier of the release number is associated with the current processor. Where it is not, a conditional register is examined and appropriate remote synchronization operations are commanded where necessary.

According to another embodiment, an information processing system implements the above-discussed method on a general purpose computer system. According to yet another embodiment, a computer readable medium comprises program code for performing the above-discussed method.

DETAILED DESCRIPTION

Figure 1:
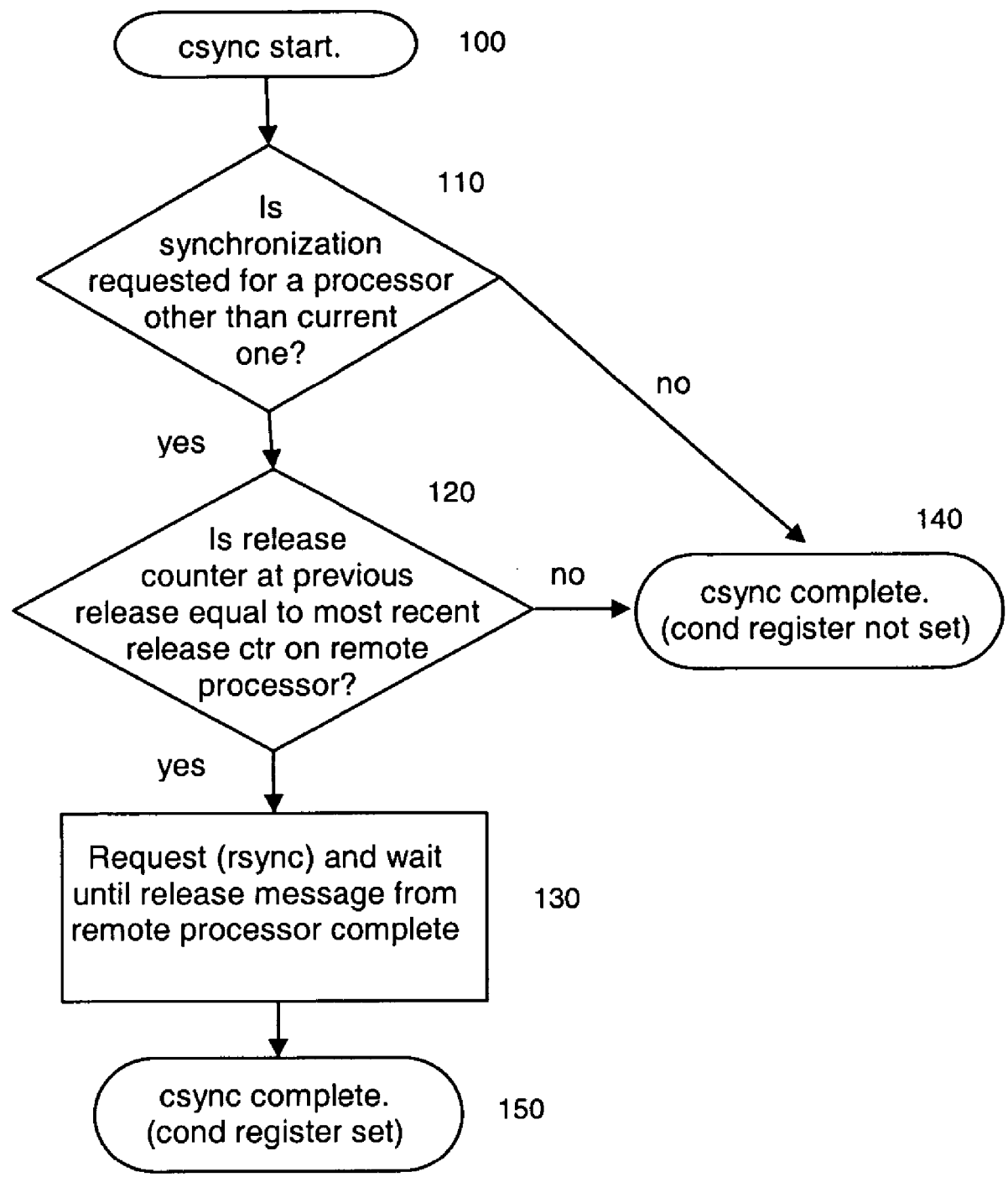
FIG. 1 illustrates a flowchart showing an algorithm for hardware implementation of a csync function.

We discuss a method, computer program product, and information processing system for streamlining synchronization protocols in execution of multi-threaded server applications. In the following description, numerous specific details are set forth by way of exemplary embodiments in order to provide a more thorough description of the present invention. It will be apparent, however, to those skilled in the art, that the present invention may be practiced without these specific details. In other instances, well-known features have not been described in detail for purposes of clarity.

Unless specifically noted, it is intended that the words and phrases in the specification and claims be given the ordinary and accustomed meaning as understood by those of skill in the applicable art. If any other meaning is intended, the specification will specifically state that a special meaning is being applied to a word or phrase.

The architecture of an information processing system according to an embodiment may include some or all of the following provisions. While the following description contains numerous specific details, such as annotation examples, demonstrative representations of graphs, example programming code, and architectural elements or algorithms details, these details are described only to provide a more thorough description of the illustrative embodiments. The invention is not intended to be limited to these specific details.

First, the conditional memory ordering is discussed from an algorithmic viewpoint. Then an implementation of this concept in the instruction set of a processor and an implementation in hardware are described.

Algorithm:

The use of conditional memory ordering may be described from the viewpoint of an application program. For illustration, a lock implementation with acquire-release semantics is used, as, for example, required by the Java programming language. The following pseudo-code represents one way for a software implementation of the acquire and release operations on a Lock data structure:

```
1    struct Lock {
2      int res;        // reserving processor, thread that holds the lock
3      int relctr;     // release counter
4      bool flag;      // true if lock is taken
5    };
6    // procid: register that holds id of current processor
7    void acquire (Lock* l) {
8      int tmp_res;
9      int tmp_relctr;
10     while (true) {
11       atomic {
12         tmp_res = l->res;
13         tmp_relctr = l->relctr;
14         if (l->flag == FALSE) {
15           l->flag = TRUE;
16           break;
17         }
18       }
19     }
20     if (csync(tmp_res, tmp_relctr))
21       isync; // PowerPC memory ordering
22   }
23   // procid: register that holds id of current processor
24   void release (Lock* l) {
25     atomic {
26       l->relctr = relctr[procid]; // relctr is hardware register
27       l->res = procid;
28       l->flag = FALSE;
29     }
30   }
```

The method to acquire and release may receive an argument as a pointer to a data structure. For the purpose of illustration herein, this type of structure will be called a "Lock." The structure Lock may comprise several fields: res, relctr, and flag. In one or more embodiments, the hardware may provide either explicit instructions to guarantee the behavior (atomic load and store), or the representation of the Lock data structure in a single word may imply this behavior. Because one of ordinary skill in the art will be aware of this, the above pseudo-code omits the details of queued waiting and a counter for reentrant acquire operations, which is typically found in lock implementations.

The following is a sample pseudo-code for hardware implementation of the csync and rysnc instructions:

```
31   // global memory that is assumed sequentially consistent across
     all processors
32   int relctr[NUM_PROC];
33   bool csync(int tprocid, int trelctr) {
34     bool ret = (tprocid != procid);
35     if (ret &&trelctr == relctr[tprocid])
36       rsync(tprocid); // issue remote sync at processor tprocid
37     return ret;
38   }
39   // this code is executed on processor procid
40   void rsync(int procid) {
41     lwsync;          // PowerPC memory ordering
42     relctr[procid] ++;  // wrap around tolerated and correct
43   }
```

This shows one embodiment showing a declaration of a global vector of release counters and the code for the operations csync and rsync; the purpose of the pseudo-code is to demonstrate the logical behavior of the protocol. These features may be implemented in hardware and their implementation is described in the following section.

Implementation of the Algorithm:

In one embodiment of the present invention, a release number may consist of a unique and constant processor id, and the value of a release counter (that wraps around at overflow). In addition, every processor may provide internal storage to hold the current release numbers of all other processors in the system. This storage may be referred to as the release vector. Also, the value of the release number of the current processor may be read through the special read-only register regRelnum. The value of other release numbers may not be read explicitly. Lastly, according to this embodiment of the invention, release numbers cannot be updated explicitly. The release counter part of a release number is incremented implicitly through the csync instruction, which is described below. It is important that the master release counter in a processor P is consistent with its copies in the release vectors of other processors, because release counters are used to enforce proper ordering of memory operations.

Csync Operation:

According to an embodiment of the invention, a new conditional memory ordering instruction csync R may operate as follows: R specifies a register that contains the release number of some processor in the system. Let R=[res|relctr|00]. Note that R may be a bitmask where the lower 2 bits are zero and the remaining bits are partitioned into field res that holds the processor identifier and field relctr for the release counter.

Referring to FIG. 1, an algorithm for hardware implementation of cync is shown. In step 110, if res == current processor, then nothing is done. This step is also reflected in the above pseudo-code, line 35. In other words, synchronization is not requested for a processor other than the current one, and csync becomes complete at step 140.

Figure 2:
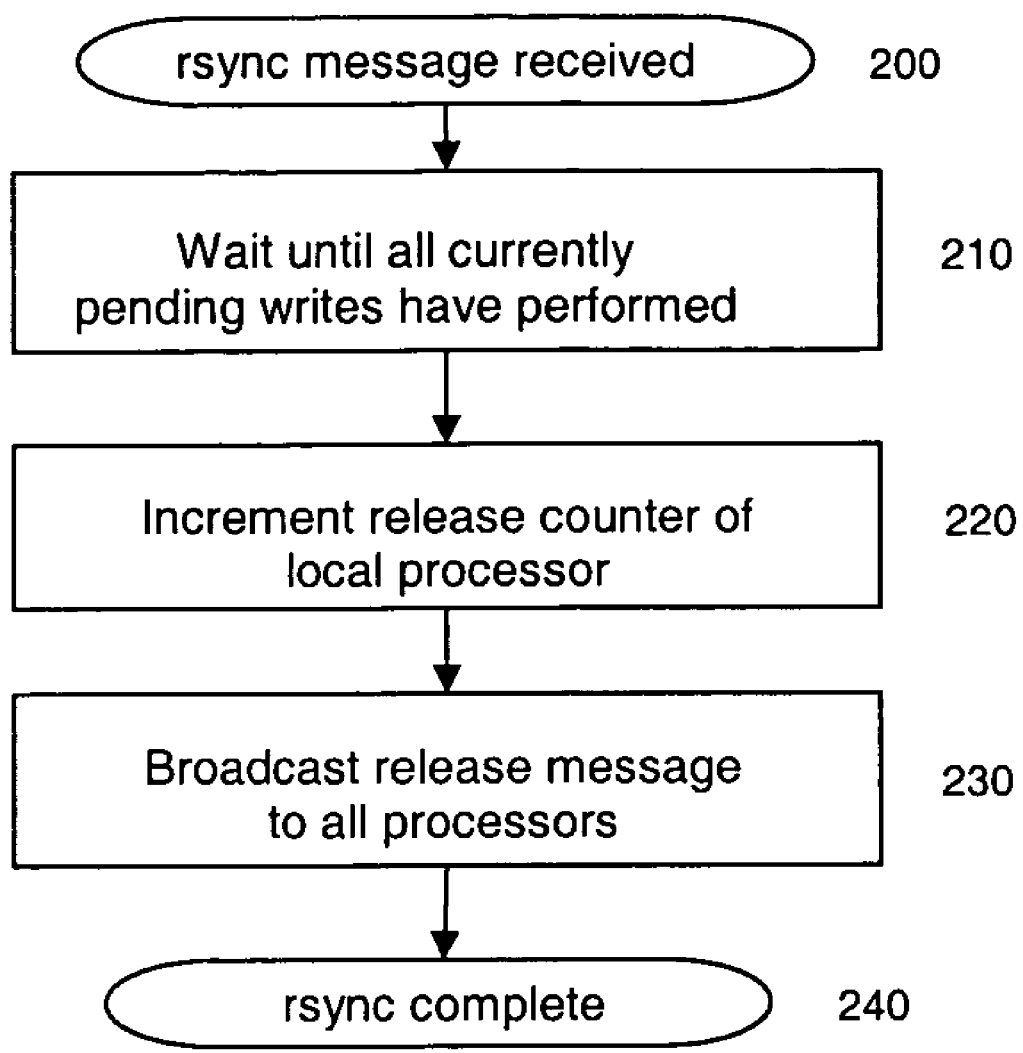
FIG. 2 illustrates a flowchart showing an algorithm for a possible hardware implementation of a rsync function.

FIG. 1 illustrates a flowchart showing an algorithm for hardware implementation of csync. This FIG. captures only the actions of the processor issuing csync. If res does not equal to the current processor, then the next step, shown in step 120, may check if relctr is equal to the release number in the release vector entry corresponding to res. If so, then a memory ordering operation is initiated at processor res (line 35 in above pseudo-code, FIG. 1, step 130). The processor res increments its release vector entry (line 44 in above pseudo-code; FIG. 2, step 220) and broadcasts the new value to all other processors (broadcast through to cache coherence mechanism); the other processors store this value in their release vector entry corresponding to res (FIG. 2, step 230). Then the instruction csync at the originating processor terminates.

Otherwise, the field relctr is not equal to the release counter in the release vector entry corresponding to res, and nothing is done (thus saving the cost of the remote memory ordering, because it can be inferred that the remote processor has already executed a memory ordering operation since writing the observed lockword, due to the fact that its release number has changed). Csync is complete, but the conditional register is not set. This is shown in step 140.

The csync instruction sets the conditional register if synchronization is requested for a processor other than the current one and the release counter at previous release is equal to the most recent release counter on the remote processor. In such a case, csync is complete and the conditional register is set, as shown in step 150.

Rsync Operation:

When a csync instruction requires another processor to perform memory ordering (FIG. 1, step 120), initiation of the memory ordering operation for the remote processor may be performed through a modification to the existing memory ordering mechanism. The flow chart in FIG. 2 illustrates the sequence of actions at the remote processor.

Whereas a conventional implementation may broadcast a message that probes any memory system queues for messages from the sending processor, in one or more embodiments of the present invention, a message is sent to the designated processor, as shown in step 200. This message initiates a memory ordering operation (rsync) on that processor. The operation comprises the following steps:

(1) In step 210, the designated processor suspends execution of memory operations until its local write queue drains.

(2) In step 220, at the completion of the release message by each processor, the release vector entry corresponding to the initiating processor is incremented.

(3) In step 230, the designated processor issues a "release message" to other memory systems queues within the network and at other processors, indicating that they should be drained of any requests originating at the designated processor.

(4) In step 240, the rsync operation completes when step 220 has been performed by the processor that initiated the rsync operation.

Therefore, while there has been described what is presently considered to be the an illustrative embodiment, it will be understood by those skilled in the art that other modifications can be made within the spirit of the invention. It is believed that the conditional memory ordering and many of its attendant advantages, will be understood from the foregoing description, and it will be apparent that various changes may be made in the form, construction and arrangement of the parts without departing from the sprit or scope of the invention or sacrificing all of the material advantages, the forms herein above described being merely preferred or exemplary embodiments thereof.

We claim:

1. A method of performing efficient conditional memory ordering in a multi-processor computer system, the method comprising:

storing in a shared memory a current release number for a first processor coupled to the shared memory, the current release number comprising: a processor identifier of the first processor; and a release counter used to enforce proper ordering of memory instructions, said release counter represents progress of a second processor at a time when the second processor last accessed the shared memory, and wherein the progress is measured by a number of synchronization operations performed by said second processor;

storing a release number vector in each processor, wherein the release number vector comprises current release numbers of all processors in the system;

executing a conditional memory ordering instruction implemented by one of the multi-processors using a register, the instruction executing locally on the one of the multi-processors using one release number of the release vector by executing instructions comprising:

providing read access to the current release number for the first processor;

using the register, determining whether the processor identifier of the one release number of the processor using the register is associated with the first processor;

if the processor identifier of the one release number is not associated with the first processor, performing, with the second processor a step of: issuing a remote memory synchronization command to execute on the second processor; and waiting for the command to complete before completing the conditional memory ordering instruction.

2. The method of claim 1 further comprising:

executing a remote memory ordering instruction by each of the plurality of processors, the instruction being capable of executing locally on the second processor;

waiting for all pending memory writes to the shared memory to complete;

incrementing the release counter of the release number of the second processor associated with the shared memory; and broadcasting the incremented release counter to the plurality of processors for storage by each into the corresponding release number of the release number vector.

* * * * *